G. SOMMERFELDT.
Seed-Drill.

No. 226,253.       Patented April 6, 1880.

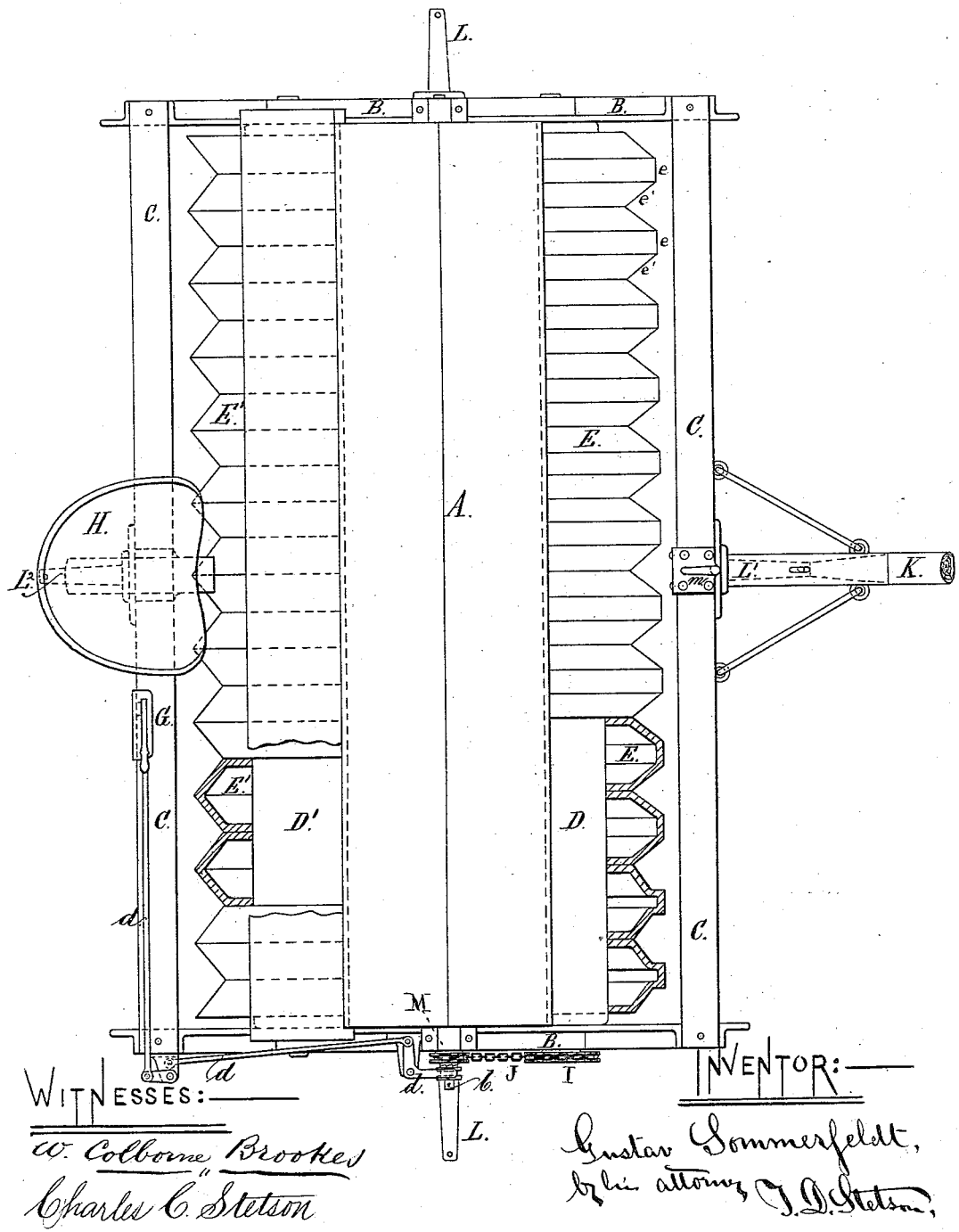

UNITED STATES PATENT OFFICE.

GUSTAV SOMMERFELDT, OF TEICHA, NEAR RIETSCHEN, PRUSSIA, GERMAN EMPIRE.

SEED-DRILL.

SPECIFICATION forming part of Letters Patent No. 226,253, dated April 6, 1880.

Application filed July 30, 1879.

*To all whom it may concern:*

Be it known that I, GUSTAV SOMMERFELDT, at Teicha, near Rietschen, in the Kingdom of Prussia and German Empire, have invented a new and useful Improvement in Seed-Drills, of which the following is a specification.

In carrying out my invention I employ a gang of revolving rollers or disks mounted upon a shaft journaled in the frame. This gang of rollers form the drill to receive the seed; and to avoid the acute angle formed in the drill by the usual V-shaped periphery, in which case the seed crowd each other in the bottom of the drill, I provide a broad periphery to each disk and bevel therefrom in each direction. This forms a well-packed drill with a level bottom, allowing the seed to separate to a considerable extent and diminish the draft. In the rear of this gang I provide another gang, similarly hung in the frame, each disk having a V-shaped periphery, and these are arranged so that the acute portion of the periphery of each traverses in the plane of the ridge formed by the preceding disks and serves to cover the grain. This alternate differential arrangement of the revolving disks and the operation relative to the seeding device with which the said disks are combined is an important feature and constitutes the first part of my invention.

In carrying out the second part of my invention I employ wheel spindles or axles upon each end of the frame and upon each side thereof to receive the wheels, upon which the whole device rides when being transported from one place to another. By this construction I am enabled to transport the machine through narrow lanes, gates, and the like by changing the riding-wheels from the ends to the sides, as is obvious, and in case of such change the spindles unemployed serve as draft attachment.

Figure 1:
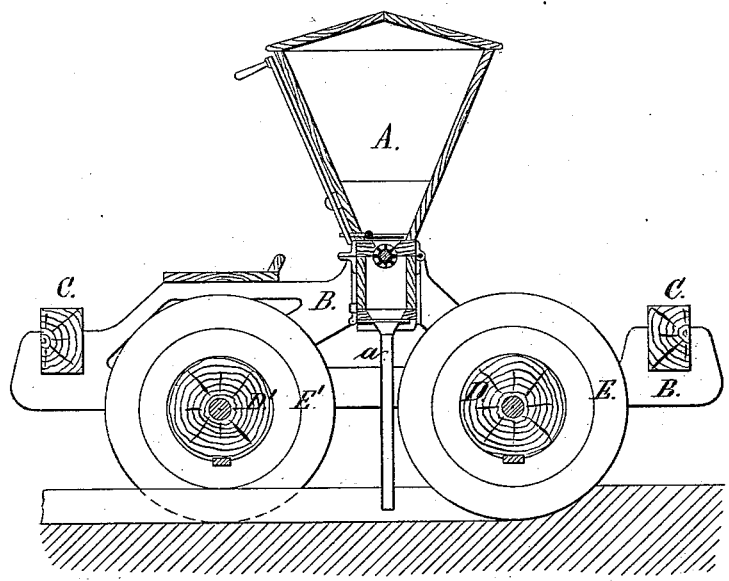
Figure 2:
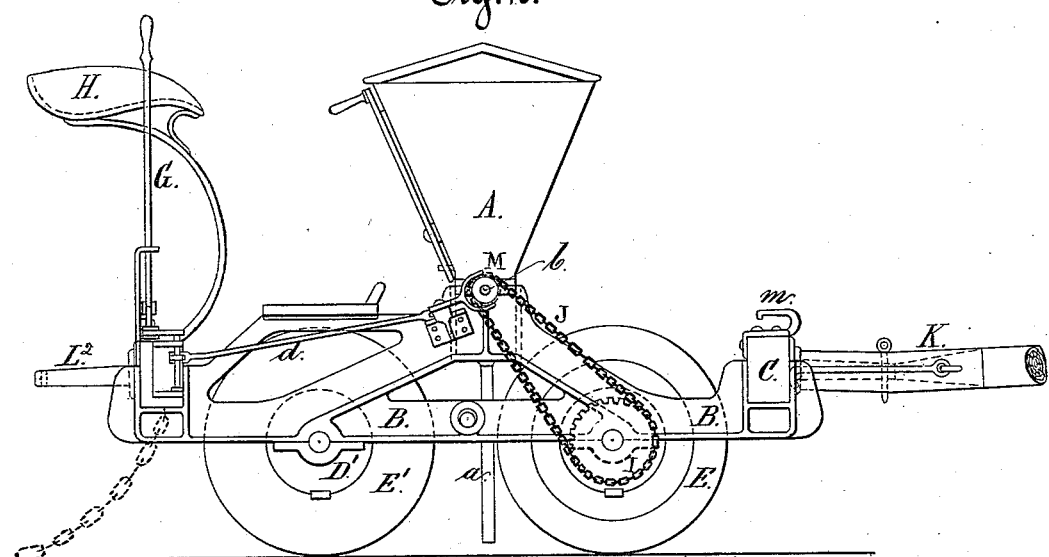

In the accompanying drawings, in which similar letters of reference indicate like parts, Figure 1 is a vertical cross-section of a seed-drill showing my invention. Fig. 2 is a side elevation. Fig. 3 is a plan view, showing some of the rings in section.

Referring to the drawings, A represents a seeding apparatus, and B C a rectangular frame. In this frame are the bearings of the trunnions of two cylinders, D D', which carry rings E E', as shown, forming two revolving rollers.

The rings E have each a plane portion, $e$, and two beveled portions, $e'$ $e'$, the inner portions of which are adjacent, as shown. This form of ring produces a drill with a wide flat bottom to allow the seed to scatter in prescribed limits, and also to form a ridge to be operated upon by the V-shaped peripheries of the rings E' following, which traverse such ridge to force the soil over the seed.

As the machine, when in operation in the field, is drawn without the aid of wheels, the motion to the seeding apparatus is furnished by one of the rollers E E'. In Fig. 2 a chain-wheel, I, carried on one of the trunnions of the front roll, E, transfers its motion by means of a chain, J, to a smaller chain-wheel, M, on the axle $b$ of the seeding apparatus.

By the hand-lever G and a suitable clutch the axle $b$ may be thrown in or out of gear, as the work requires.

K represents the draft-pole, and it is adapted to be secured to either of the spindles L L L' L². The spindles L L are upon the ends of the frame B C, and either may be used for draft attachment when the riding-wheels are in service upon the spindles L' L². $m$ represents the draft-attaching device.

When in operation the riding-wheels are removed and the draft attached to the spindle L'.

Various modifications may be made without departing from the principle of my invention.

What I claim as new is—

1. The roll E, formed of rings and adapted to produce drills and ridges, and the roll E', formed of rings and adapted to traverse the ridges thus formed, in combination with a seeding device, A $a$, and connected operating mechanism, as herein specified.

2. The spindles L L L' L², the draft-pole K, and riding-wheels, as shown, combined and adapted to serve interchangeably, for the purposes described.

This specification signed by me this 12th day of June, 1879.

GUSTAV SOMMERFELDT.

Witnesses:
  CARL T. BURCHARDT,
  BERTHOLD ROI.